US012632124B2

(12) United States Patent
Nakade et al.

(10) Patent No.: US 12,632,124 B2
(45) Date of Patent: *May 19, 2026

(54) HEAD-MOUNTED DISPLAY

(71) Applicant: MAXELL, LTD., Kyoto (JP)

(72) Inventors: Mayumi Nakade, Otokuni-gun (JP);
Yasunobu Hashimoto, Otokuni-gun
(JP); Masuo Oku, Otokuni-gun (JP)

(73) Assignee: Maxell, Ltd., Kyoto (JP)

( * ) Notice: Subject to any disclaimer, the term of this
patent is extended or adjusted under 35
U.S.C. 154(b) by 0 days.

This patent is subject to a terminal dis-
claimer.

(21) Appl. No.: 19/198,972

(22) Filed: May 5, 2025

(65) Prior Publication Data

US 2025/0264939 A1      Aug. 21, 2025

Related U.S. Application Data

(63) Continuation of application No. 17/613,022, filed as
application No. PCT/JP2019/020230 on May 22,
2019, now Pat. No. 12,321,524.

(51) Int. Cl.
*G06F 3/01* (2006.01)
*G02B 27/00* (2006.01)
(Continued)

(52) U.S. Cl.
CPC ......... *G06F 3/017* (2013.01); *G02B 27/0093*
(2013.01); *G02B 27/0101* (2013.01);
(Continued)

(58) Field of Classification Search
CPC ............ G02B 27/0093; G02B 27/0101; G02B
27/017; G02B 27/0179; G02B 2027/0138;
(Continued)

(56) References Cited

U.S. PATENT DOCUMENTS 5,917,495 A      6/1999  Doi et al.
6,771,294 B1 *   8/2004  Pulli ...................... G06F 3/011
                                                                 715/764
(Continued)

FOREIGN PATENT DOCUMENTS

JP       H09-152954 A      6/1997
JP       2013-174642 A      9/2013
(Continued)

OTHER PUBLICATIONS

Office Action dated Mar. 11, 2025, from corresponding Japan Patent
Application No. 2024-090646, 13 pages.
(Continued)

*Primary Examiner* — Cory A Almeida
(74) *Attorney, Agent, or Firm* — Rimon P.C.

(57) ABSTRACT

A head-mounted display comprises: a camera that captures
an image of the real space and acquires captured video; a
distance-measuring camera that measures a distance from a
real object in the real space; and a controller. The controller
comprises: captured object processing for recognizing the
real object from the captured video; AR object processing
for obtaining the AR object and assigning a position, which
includes a distance in the real space, to the AR object, and
displayed video generation processing for generating dis-
played video in the MR space while reflecting the perspec-
tive of the real object and the AR object in the video. The
controller is further provided with: processing for detecting
an operation-screen display object from the captured video;
and processing for displaying an MR-space operation screen
on the operation-screen display object. Video on the opera-
tion screen includes the AR object in the MR space.

6 Claims, 15 Drawing Sheets

(51) Int. Cl.

| | |
|---|---|
| *G02B 27/01* | (2006.01) |
| *G06V 20/20* | (2022.01) |
| *G06V 20/64* | (2022.01) |
| *G06V 40/10* | (2022.01) |
| *G06V 40/20* | (2022.01) |

(52) U.S. Cl.
CPC ....... *G02B 27/017* (2013.01); *G02B 27/0179* (2013.01); *G06F 3/011* (2013.01); *G06F 3/012* (2013.01); *G06V 20/20* (2022.01); *G06V 20/64* (2022.01); *G06V 40/10* (2022.01); *G06V 40/20* (2022.01); *G06V 40/28* (2022.01); *G02B 2027/0138* (2013.01); *G02B 2027/014* (2013.01); *G02B 2027/0141* (2013.01); *G02B 2027/0178* (2013.01); *G02B 2027/0185* (2013.01); *G02B 2027/0187* (2013.01)

(58) Field of Classification Search
CPC ...... G02B 2027/014; G02B 2027/0141; G02B 2027/0178; G02B 2027/0185; G02B 2027/0187; G06F 3/011; G06F 3/012; G06F 3/017; G06V 20/20; G06V 20/64; G06V 40/10; G06V 40/20; G06V 40/28
See application file for complete search history.

(56) References Cited

U.S. PATENT DOCUMENTS

| | | | |
|---|---|---|---|
| 2013/0222410 A1 | 8/2013 | Kameyama et al. | |
| 2014/0368535 A1* | 12/2014 | Salter ..................... | G06F 3/013 |
| | | | 345/619 |
| 2015/0269783 A1* | 9/2015 | Yun ....................... | G06F 3/0304 |
| | | | 345/633 |
| 2017/0255838 A1 | 9/2017 | Norieda et al. | |
| 2017/0344124 A1 | 11/2017 | Douxchamps et al. | |
| 2022/0244788 A1 | 8/2022 | Nakade et al. | |

FOREIGN PATENT DOCUMENTS

| | | | |
|---|---|---|---|
| JP | 2014067388 | A | 4/2014 |
| JP | 2017-027206 | A | 2/2017 |
| JP | 2017-157142 | A | 9/2017 |
| JP | 2018-73170 | A | 5/2018 |
| JP | 7157244 | B2 | 10/2022 |

OTHER PUBLICATIONS

Non-Final Office Action issued in U.S. Appl. No. 17/613,022, dated Mar. 31, 2023.
Final Office Action issued in U.S. Appl. No. 17/613,022, dated Jan. 3, 2024.
Non-Final Office Action issued in U.S. Appl. No. 17/613,022, dated Jul. 15, 2024.
Notice of Allowance issued in U.S. Appl. No. 17/613,022, dated Feb. 20, 2025.
Extended European Search Report issued in the corresponding EP Patent Application No. 25186758.6, dated Sep. 24, 2025.
Notice of Reasons for Refusal received in corresponding Japanese Patent Application No. 2022-161325, dated Sep. 26, 2023.
Extended European Search Report issued in corresponding European Patent Application No. 19929455.4 dated Nov. 29, 2022.
International Search Report issued in corresponding International Patent Application No. PCT/JP2019/020230, dated Aug. 20, 2019, with English translation.

* cited by examiner

FIG. 4
(a)
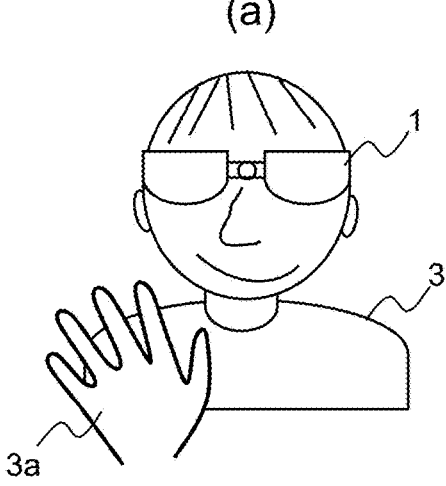
(b)
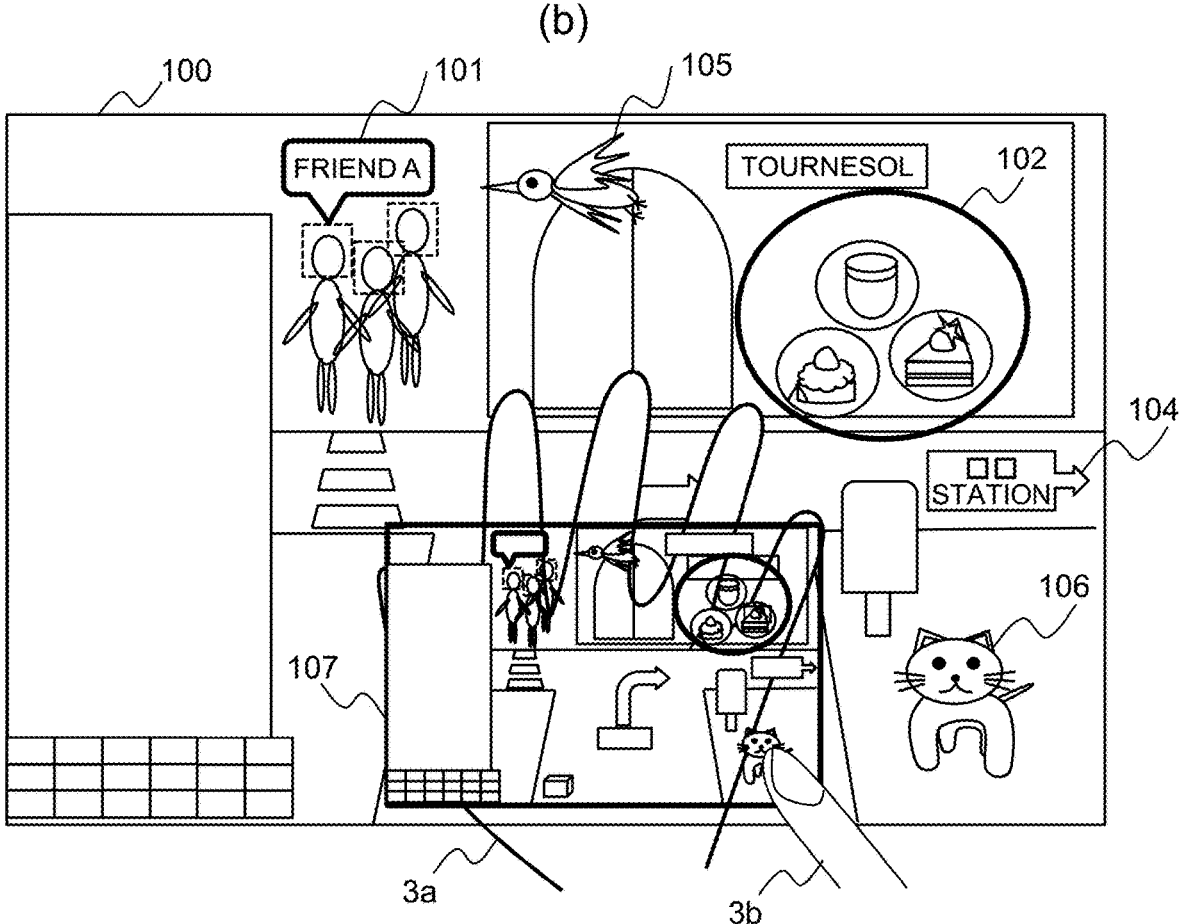

FIG. 6

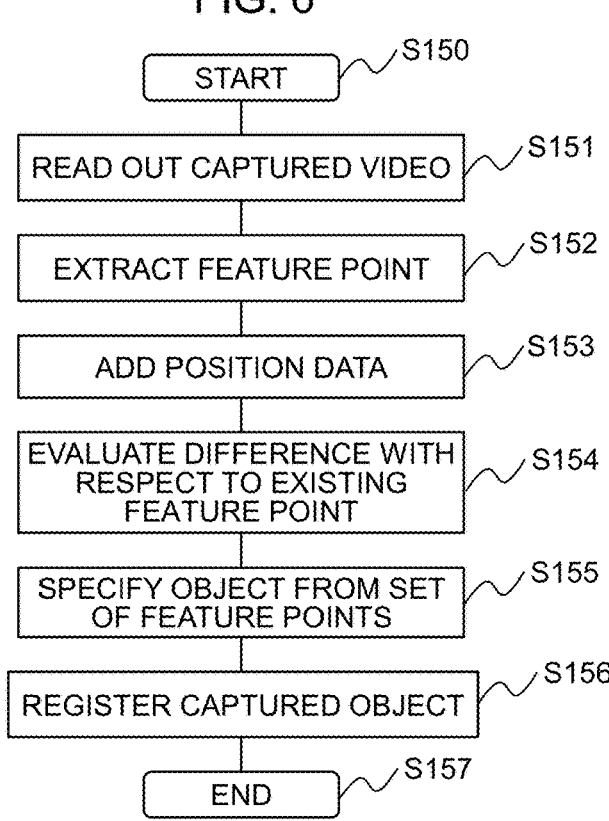

START —S150

READ OUT CAPTURED VIDEO —S151

EXTRACT FEATURE POINT —S152

ADD POSITION DATA —S153

EVALUATE DIFFERENCE WITH RESPECT TO EXISTING FEATURE POINT —S154

SPECIFY OBJECT FROM SET OF FEATURE POINTS —S155

REGISTER CAPTURED OBJECT —S156

END —S157

FIG. 7

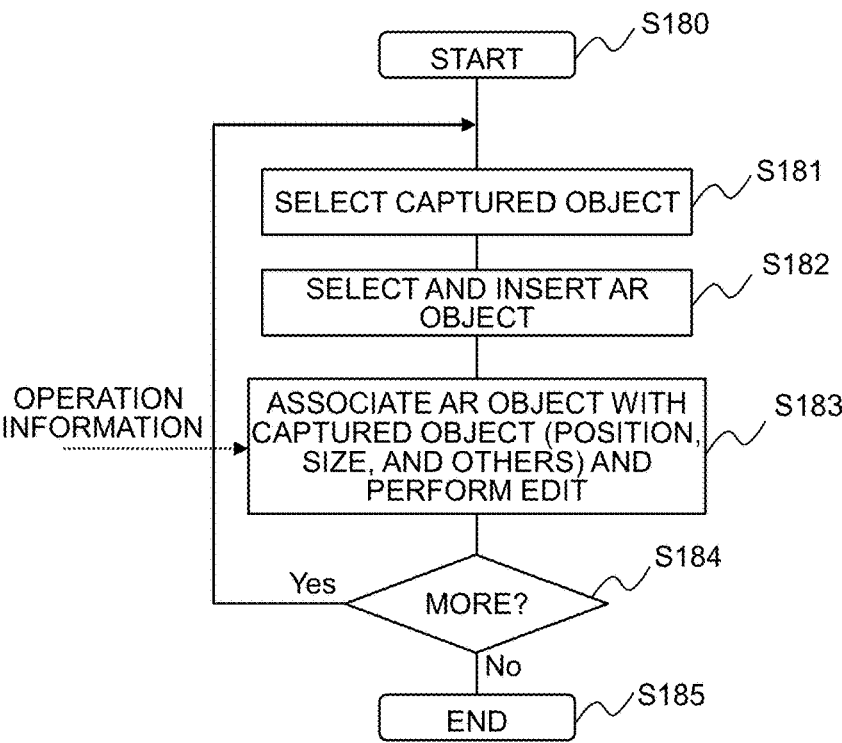

START —S180

SELECT CAPTURED OBJECT —S181

SELECT AND INSERT AR OBJECT —S182

OPERATION INFORMATION ----▶ ASSOCIATE AR OBJECT WITH CAPTURED OBJECT (POSITION, SIZE, AND OTHERS) AND PERFORM EDIT —S183

MORE? —S184

Yes

No

END —S185

FIG. 8

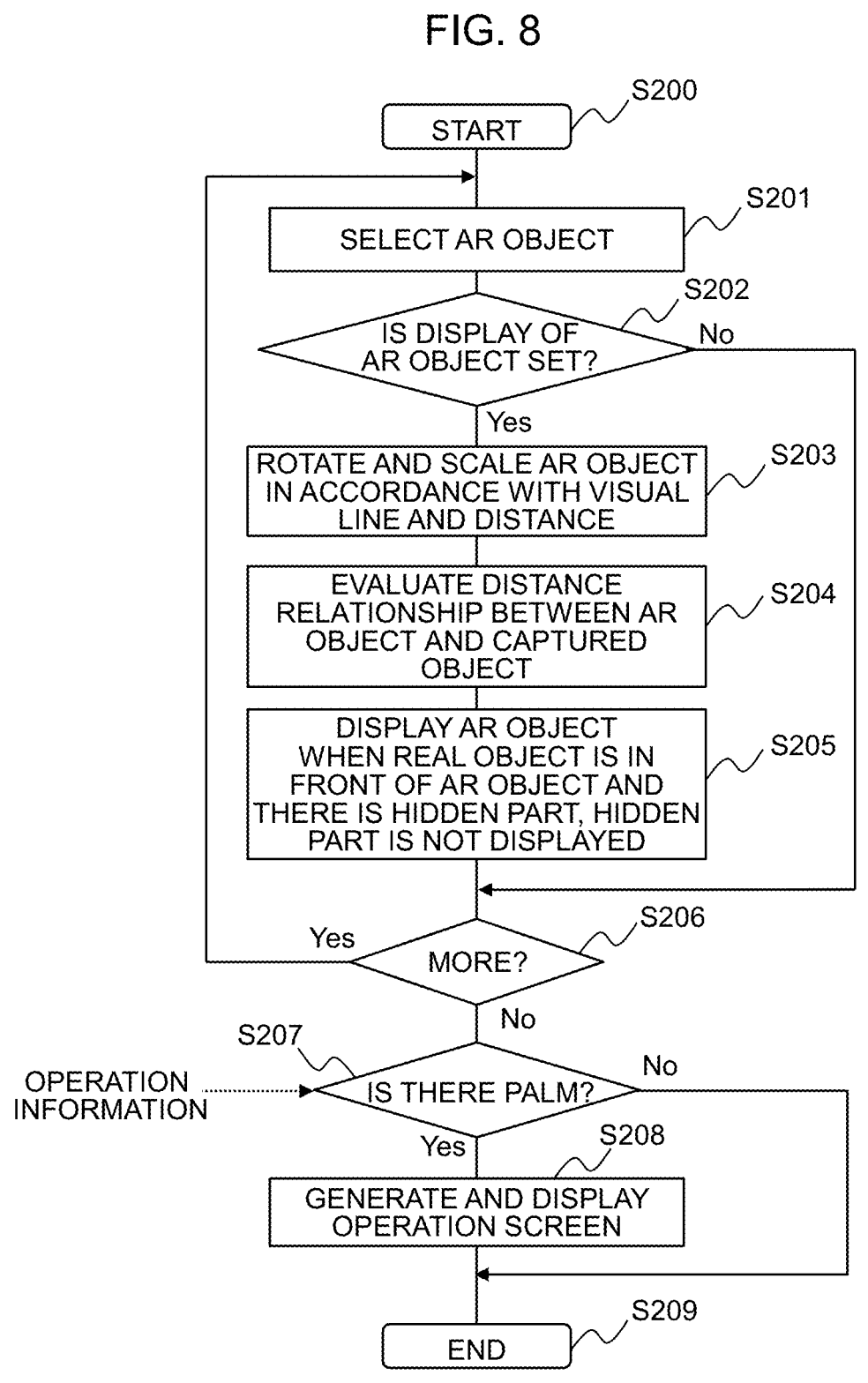

```
                    ┌──────────┐
                    │  START   │  S200
                    └──────────┘
                         │
              ┌──────────────────────┐
              │   SELECT AR OBJECT    │  S201
              └──────────────────────┘
                         │
                    ╱─────────╲                    S202
                   ╱ IS DISPLAY ╲      No
                  ╱ OF AR OBJECT  ╲───────────┐
                   ╲    SET?      ╱            │
                    ╲───────────╱             │
                         │ Yes                │
         ┌──────────────────────────────┐     │
         │ ROTATE AND SCALE AR OBJECT    │ S203│
         │ IN ACCORDANCE WITH VISUAL     │     │
         │ LINE AND DISTANCE             │     │
         └──────────────────────────────┘     │
                         │                     │
         ┌──────────────────────────────┐     │
         │ EVALUATE DISTANCE             │ S204│
         │ RELATIONSHIP BETWEEN AR       │     │
         │ OBJECT AND CAPTURED           │     │
         │ OBJECT                        │     │
         └──────────────────────────────┘     │
                         │                     │
         ┌──────────────────────────────┐     │
         │ DISPLAY AR OBJECT             │ S205│
         │ WHEN REAL OBJECT IS IN        │     │
         │ FRONT OF AR OBJECT AND        │     │
         │ THERE IS HIDDEN PART, HIDDEN  │     │
         │ PART IS NOT DISPLAYED         │     │
         └──────────────────────────────┘     │
                         │◄────────────────────┘
             Yes    ╱─────────╲   S206
           ┌───────╱  MORE?   ╲
           │        ╲─────────╱
           │             │ No
           │        ╱─────────╲           No
  OPERATION│       ╱ IS THERE  ╲──────────┐
INFORMATION┄┄┄┄┄►  ╲  PALM?    ╱          │
  S207     │        ╲─────────╱           │
           │         │ Yes    S208        │
           │  ┌──────────────────┐        │
           │  │ GENERATE AND      │       │
           │  │ DISPLAY OPERATION │       │
           │  │ SCREEN            │       │
           │  └──────────────────┘        │
           │         │◄───────────────────┘
                ┌──────────┐
                │   END    │  S209
                └──────────┘
```

(a)                    (b)

(a)                    (b)

FIG. 12
(a)
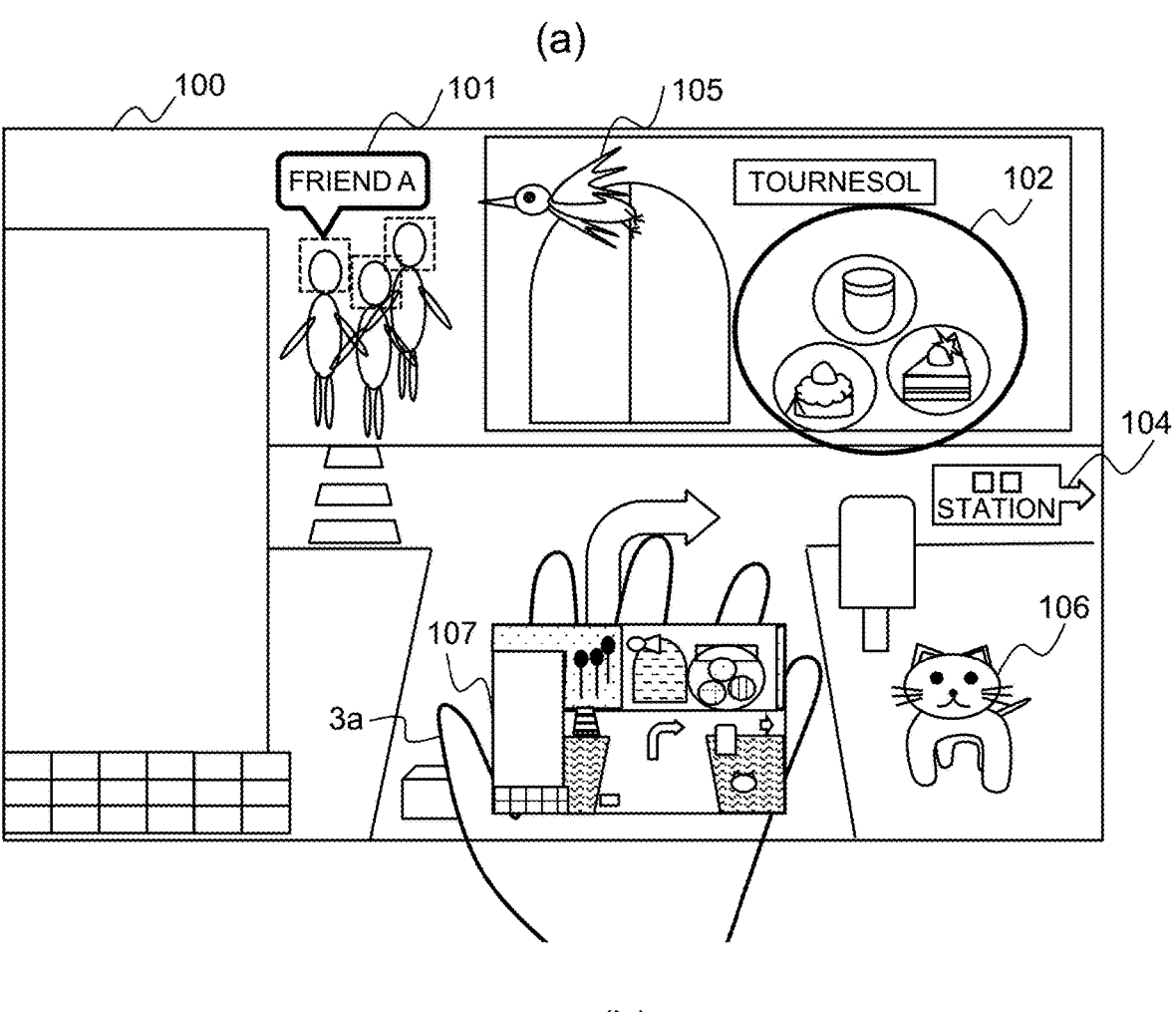
(b)
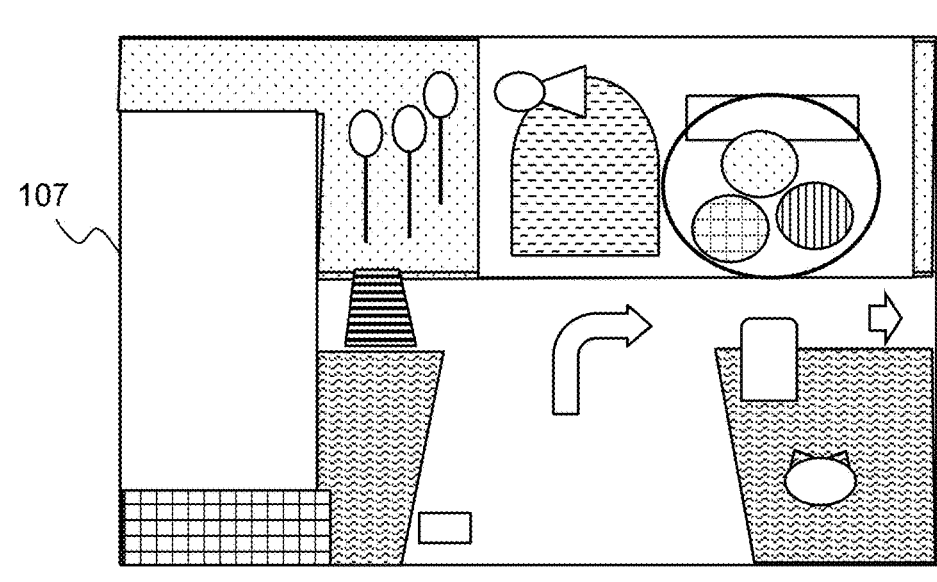

FIG. 14
(a)
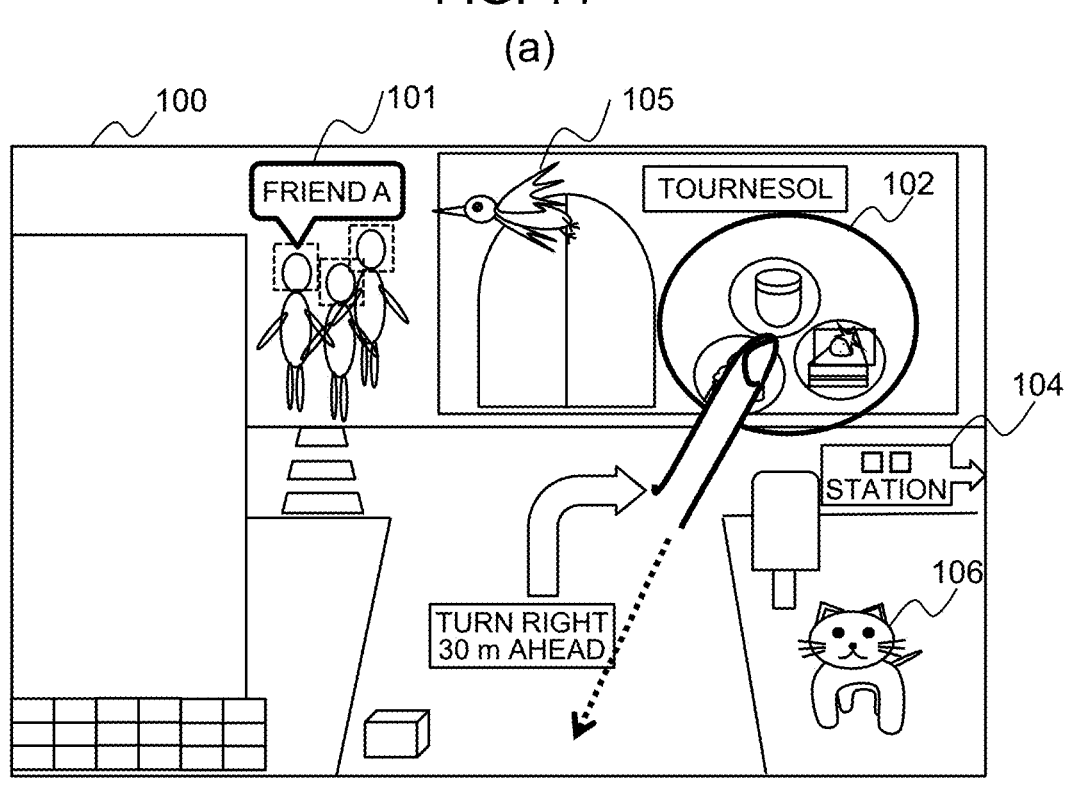
(b)
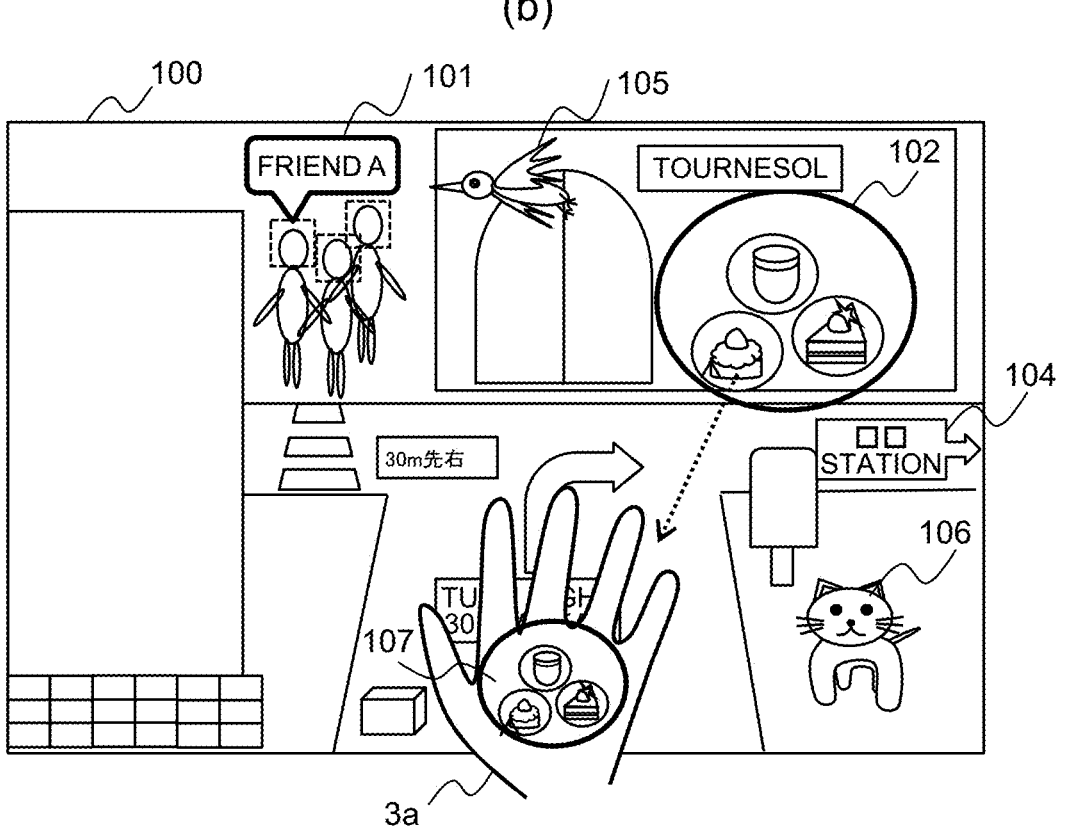

FIG. 15
(a)
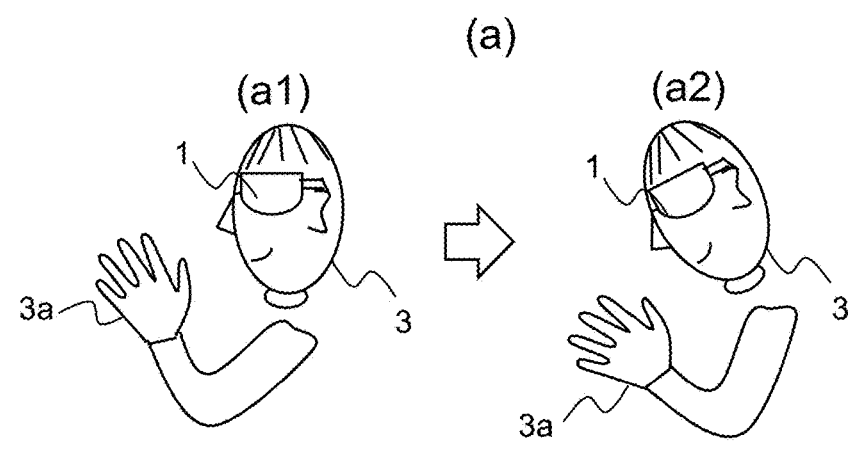
(a1) → (a2)
(b)
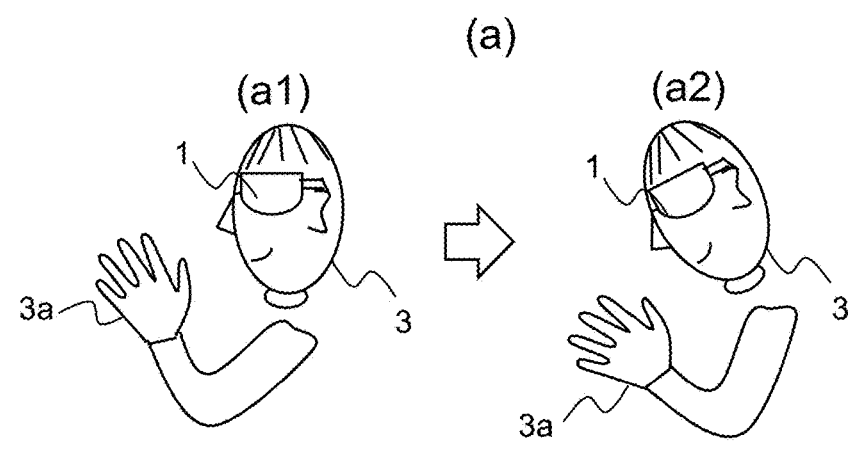

(a)        (b)

HEAD-MOUNTED DISPLAY

CROSS-REFERENCE TO RELATED APPLICATIONS

This application is a Continuation of U.S. patent application Ser. No. 17/613,022, filed Nov. 19, 2021, which is the U.S. National Phase under 35 U.S.C. § 371 of International Application No. PCT/JP2019/020230, filed on May 22, 2019, the entire contents are hereby incorporated by reference.

TECHNICAL FIELD

The present invention relates to a head-mounted display (HMD) used for a mixed reality (MR) system for displaying a real space and a virtual space (also referred to as a virtual object) that are superimposed on one another.

BACKGROUND ART

Visually recognizing the video of a virtual object (argument reality (AR) object) such as video or a letter by displaying the virtual object in a real space to be superimposed thereon is used in contents such as a game or maintenance work. Examples of the game include a game for catching a character (the AR object) arranged in a public place such as the park or the station and competing for the type or score of the caught character, and examples of the maintenance include a case where work is performed in accordance with work instruction video (the AR object) in a narrow pit of an elevator.

Here, in order to display the AR object, video referred to as an AR trigger or a mark is captured by a camera along with the background, and the AR object associated with the AR trigger is arranged in the real space. Alternatively, there is a method in which the real space in which a user exists is associated with a space coordinate system, and the AR object is arranged in an arbitrary space coordinate position to be superimposed thereon.

In an MR system, the HMD in which a camera, a display optical system, and a sensor are integrated is mounted on the user, the image of the real space is captured by the camera, and the real space is represented by the space coordinate system using the sensor. In the display optical system, the AR object is arranged in an arbitrary position of the space coordinate system, and the video of the AR object is displayed in the real space to be superimposed thereon. Further, in the MR system, the image of the hand of the user, or the like placed in the real space is captured by the camera, and the AR object is operated in accordance with the movement of the hand, that is, a gesture. However, the operation according to the gesture annoys others in the public place, and in a narrow place, it is difficult to make a large movement such as the gesture.

Patent Document 1 is provided as the related art in this technical field. In Patent Document 1, an information input device is disclosed in which video for operation input is projected onto the palm and in the vicinity thereof, and the operation input is specified in accordance with the movement of the palm.

CITATION LIST

Patent Document

Patent Document 1: JP 2018-73170 A

SUMMARY OF THE INVENTION

Problems to be Solved by the Invention

In the MR system, an intuitive operation is required in which an arbitrary AR object in an MR space (a space in which the AR object is superimposed on the real space) is selected, and the AR object is operated in response to a change in the MR space. However, in the method of selecting a button for operation input to be projected on the palm, which is disclosed in Patent Document 1, it is difficult to attain the intuitive operation in the MR space.

The present invention has been made in consideration of such circumstances, and the purpose thereof is to provide an HMD of an MR system that is capable of being used even in a public place, a narrow place, or the like and intuitively operating an AR object in response to a change in an MR space by selecting an arbitrary AR object in the MR space.

Solutions to Problems

In order to attain the purpose, as an example, the present invention provides a head-mounted display displaying an AR object in a real space so as to form an MR space, the display including: a camera that captures an image of the real space and acquires captured video; a distance-measuring camera that measures a distance from a real object in the real space; and a controller, in which the controller includes captured object processing for recognizing the real object from the captured video, AR object processing for obtaining the AR object and assigning a position, which includes a distance in the real space, to the AR object, and displayed video generation processing for generating displayed video in the MR space while reflecting perspective of the real object and the AR object, and further includes processing for detecting an operation-screen display object from the captured video and processing for displaying an MR space operation screen on the operation-screen display object, and video on the operation screen includes the AR object in the MR space.

Effects of the Invention

According to the present invention, a user is capable of directly operating an AR object reflected on an operation screen, and an intuitive operation is capable of being performed in an MR space.

BRIEF DESCRIPTION OF THE DRAWINGS

FIG. 4 is a diagram describing an operation method of the MR space in Example 1.

FIG. 6 is a flowchart of a captured object process in Example 1.

FIG. 7 is a flowchart of an AR object process in Example 1.

FIG. 8 is a flowchart of a displayed video generation process in Example 1.

FIG. 12 is an explanatory diagram in which video on an operation screen in Example 3 is simplified to be more visible.

FIG. 14 is an explanatory diagram in which only an AR object is reflected on video on an operation screen in Example 4.

FIG. 15 is an explanatory diagram of an operation method of an operation screen in Example 5 in an easy system.

MODE FOR CARRYING OUT THE INVENTION

Hereinafter, Examples of the present invention will be described with reference to the drawings.

Example 1

Figure 1:
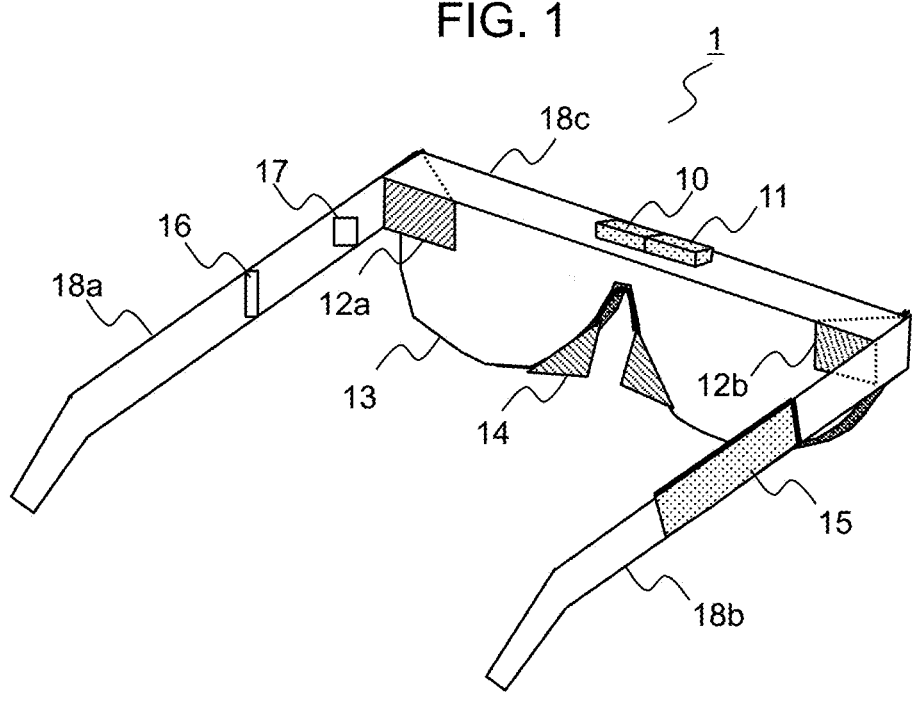
FIG. 1 is a schematic external configuration diagram of an HMD in Example 1.

FIG. 1 is a schematic external configuration diagram of an HMD in this Example. In FIG. 1, a reference numeral 1 is an HMD, a reference numeral 10 is a camera, a reference numeral 11 is a distance-measuring camera, reference numerals 12a and 12b are a display optical system (a video projection unit), a reference numeral 13 is a transmission-type optical system such as a lens or a screen, a reference numeral 14 is a nose pad, a reference numeral 15 is a controller, a reference numeral 16 is a speaker, a reference numeral 17 is a microphone, and reference numerals 18a, 18b, and 18c are a frame housing.

The HMD 1 is mounted on the face of a user by the frame housings 18a and 18b and the nose pad 14.

The camera 10 is attached to capture an image of the front of the visual line of the user, and the distance-measuring camera 11 measures a distance from a real object (including the background such as a wall) in a real space captured in the captured video of the camera 10.

The distance-measuring camera 11 may calculate the distance to a feature point such as the outline of the real object by a method such as a stereo camera, measure the distance by two-dimensional irradiation of a light ray such as a time of flight (TOF) method, or measure the distance from the real object, corresponding to the captured video of the camera.

The display optical systems 12a and 12b project video (12a) for checking a virtual object (an AR object) with the left eye and video (12b) for checking the virtual object with the right eye onto the transmission-type optical system 13 to be displayed. The front landscape or the real object can be seen by the user through the transmission-type optical system 13, and the virtual object projected from the display optical systems 12a and 12b is visually recognized as being in a predetermined position in the real space by the transmission-type optical system 13.

The controller 15 imports position data of the real space such as the video in the real space captured by the camera 10 or the real object acquired by the distance-measuring camera 11 to be supplied to an internal memory or a CPU. In addition, a sensor group such as a gyroscope sensor, an orientation sensor, a position sensor, and a contact sensor is built in the controller 15. Further, the video projected by the display optical systems 12a and 12b or sound output to the speaker 16 is created. The controller 15, the camera 10, the distance-measuring camera 11, the speaker 16, and the microphone 17 are arranged in the frame housings 18a, 18b, and 18c. Note that, an arrangement place may not be as illustrated in FIG. 1.

Further, the controller 15 includes a user interface (UI) with respect to the user, which is mainly processed by the CPU. Examples of the user interface include operation input processing described below.

Figure 2:
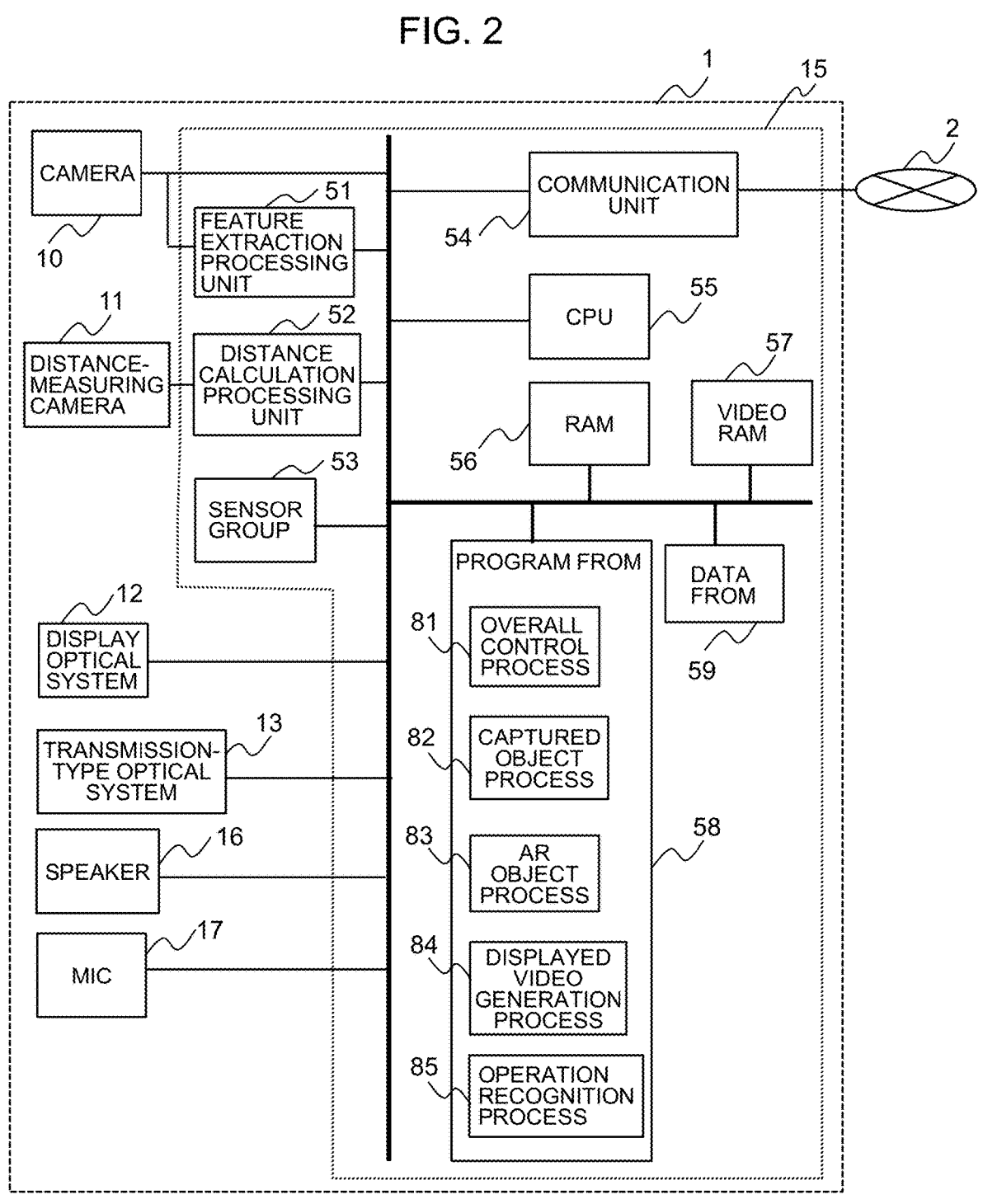
FIG. 2 is a configuration block diagram of the HMD in Example 1.

FIG. 2 is a configuration block diagram of the HMD 1 in this Example. In FIG. 2, the same reference numerals are applied to the same constituents as those in FIG. 1. A reference numeral 51 is a feature extraction processing unit, a reference numeral 52 is a distance calculation processing unit, a reference numeral 53 is a sensor group, a reference numeral 54 is a communication unit, a reference numeral 55 is a CPU, a reference numeral 56 is a RAM, a reference numeral 57 is a video RAM, a reference numeral 58 is a program flash ROM (FROM), and a reference numeral 59 is a data FROM.

The display optical system 12 corresponds to the display optical systems 12a and 12b in FIG. 1. The display optical system 12 independently projects the video for the left eye and the video for the right eye onto the transmission-type optical system 13, as with the display optical systems 12a and 12b. In addition, the video for the left eye and the video for the right eye, which are interleaved, may be projected by one projector, and the video for the left eye and the video for the right eye may be transmitted to each eye by a shutter optical system. Further, an optical system using a holographic lens may be used.

The communication unit 54 is capable of connecting a network 2 to the HMD 1. A part of the processing of the HMD 1 may be executed by an external server (not illustrated) on the network 2.

The program FROM 58 includes an overall control process 81, a captured object process 82, an AR object process 83, a displayed video generation process 84, an operation recognition process 85, and the like, which configure processing programs. Such processing programs are decompressed in the RAM 56 and executed by the CPU 55. Further, in the data FROM 59, a procedure for executing such processing programs and data generated as a result can be stored.

Note that, the program FROM 58 and the data FROM 59 may include separate memory media as illustrated, or may include one memory medium. Further, two or more memory media may be used, or a non-volatile memory medium may be used instead of the FROM. In addition, a part of the data in the data FROM 59 may be placed in the external server on the network 2. Video data that is generated by the displayed video generation process 84 is stored in the video RAM 57, and read out from the video RAM 57 to be projected by the display optical system 12.

Figure 3:
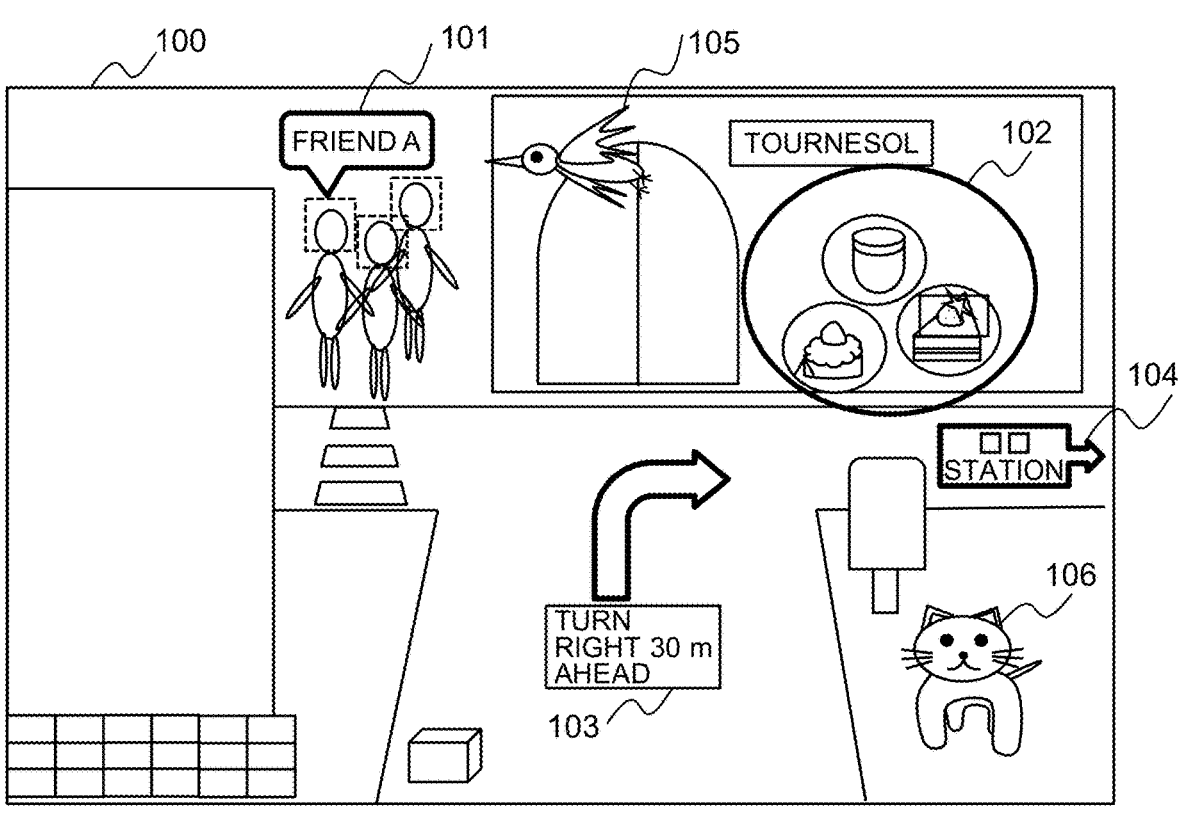
FIG. 3 is an example of displayed video in an MR space in Example 1.

FIG. 3 is an example of displayed video in an MR space in this Example. In FIG. 3, a reference numeral 100 is an MR space, reference numerals 101 to 106 are AR objects, and video other than the AR objects is the background that is visually recognized by the user as the real space through the transmission-type optical system 13.

In FIG. 3, the background that is visually recognized by the user is a street corner, and the user, for example, is heading to □□ station by using a route guidance application. An AR object 103 is guiding the user to turn right 30 m ahead of the current position, and an AR object 104 is guiding that there is □□ station in the direction where the user turns right. Further, AR objects represent the description of the background. An AR object 101 recognizes a person slightly on the left from the front of the background and represents that the person is a friend A by checking against an interaction relationship of the user, and an AR object 102 recognizes a signboard "Tournesol" of a store on the right from the front and displays an example of the representative menu of the store.

In addition, the user is enjoying a game for catching small animals (characters). AR objects 105 and 106 are the characters of the game. The character may move, and in order to catch the character, an operation according to a display position of the character is required.

FIG. 4 is a diagram describing an operation method of the MR space in this Example. In FIG. 4(a), a reference numeral 1 is an HMD, a reference numeral 3 is a user, and a reference numeral 3a is a palm of the user. In a case where an operation starts in the MR space, the user 3 holds the palm 3a of the user in a camera capturing range of the HMD 1.

FIG. 4(b) illustrates the displayed video in the MR space in which an operation screen 107 is displayed on or in front of the palm 3a of the user by detecting the palm 3a of the user. The operation screen 107 is video in which the palm 3a of the user is removed from the displayed video in the MR space of the HMD 1. The palm 3a of the user can be removed, for example, by storing the video before holding the palm 3a of the user and substituting the region of the palm 3a of the user with the video that is stored. In addition, the user 3 adjusts the position of the palm 3a of the user, for example, by moving the palm 3a to right and left such that the AR object to be operated by palm 3a of the user is not hidden.

A reference numeral 3b is a finger of a hand different from the palm 3a that is held by the user, and is an instruction object for operating the AR object by pointing the AR object in the operation screen 107. The content that can be operated is different in accordance with the AR object, and for example, in FIG. 4(b), the character of the AR object 106 is caught by selecting the AR object 106. In addition, a menu display that can be operated may be displayed by selecting the AR object, and operations in the menu may be selected by sliding the finger.

As described above, the user is capable of displaying operation screen, which is a slave screen for an operation, on or in front of the palm of the user and directly operating the AR object reflected on the operation screen. Therefore, it is possible to perform the operation on the palm, it is not necessary to make a large movement in the space, and it is possible to perform an intuitive operation in the MR space.

Figure 5:
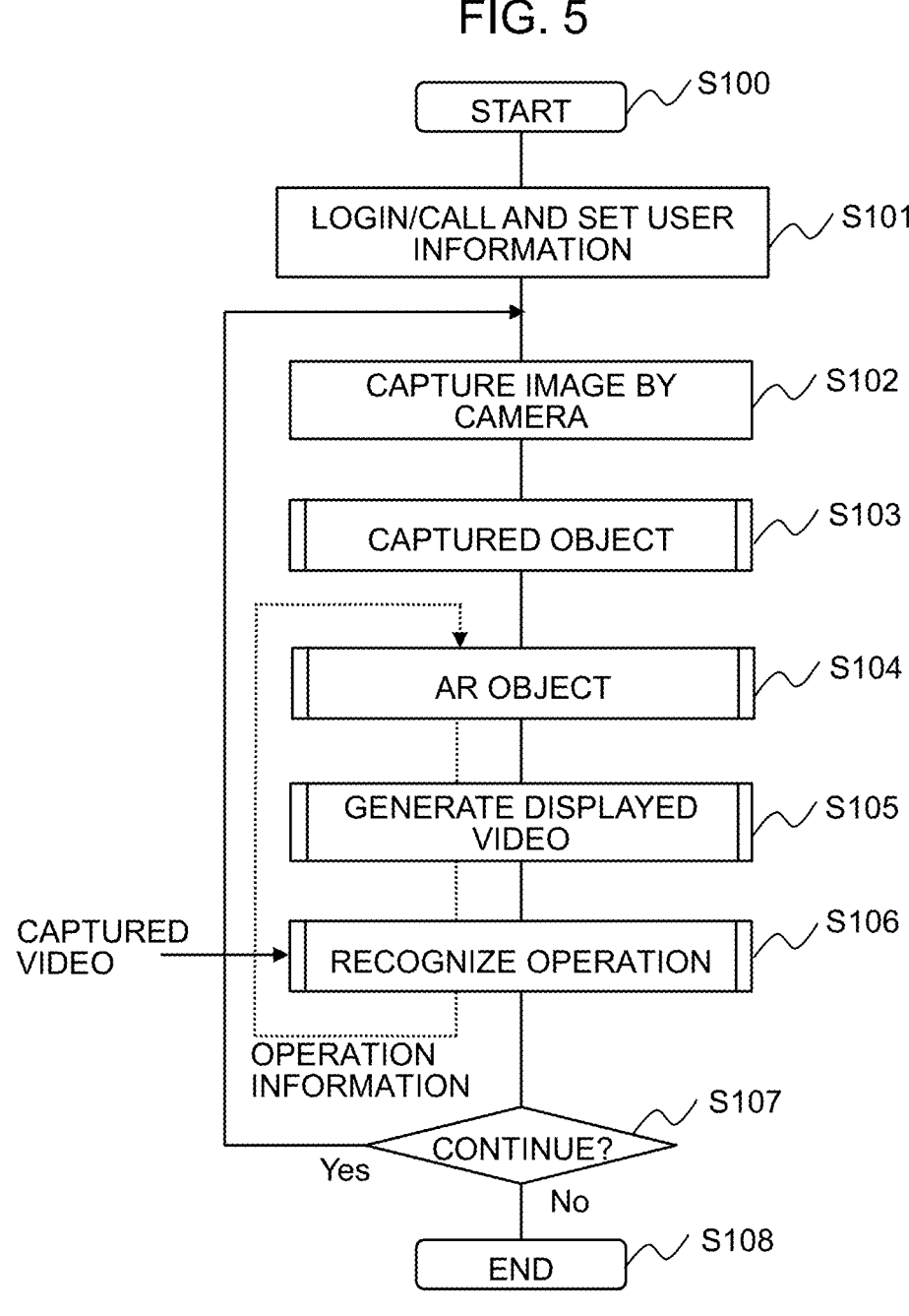
FIG. 5 is a flowchart of an overall control process of MR processing in Example 1.

FIG. 5 is the flow of the overall control process 81 of MR processing in this Example. In FIG. 5, the process starts at S100. In S101, as necessary, login is performed so as to use the HMD 1. A login server may be a personal computer on an intranet, or may be a server connected through the external network 2. Alternatively, processing may be performed in the HMD 1. By performing the login, setting intrinsic to the user (user information), which is registered in advance, is called from the data FROM 59. Examples of the setting intrinsic to the user include setting relevant to a display such as a luminance, contrast, color combination, or a menu display position, which is more visible to the user. In addition, examples of the setting intrinsic to the user may be the name of the user or an icon such as an avatar.

In S102, the image of the real space is captured by using the camera 10 and the distance-measuring camera 11. The camera capturing may be performed at a timing when the overall MR processing is executed, and for example, a moving image at 30 frames per second (fps) may be continuously captured, and video may be captured at a timing when the overall MR processing is executed.

In S103, the captured object process 82 is executed, the feature of the video captured by the camera is extracted such that the feature point is selected, and the shape or the like of the real object is specified with respect to a set of feature points to be registered as a captured object. Examples of the captured object include a person or a signboard of a store, which features the real space. In the HMD 1, the real object is treated as captured object data. In the real space, the wall of a room, a far-off landscape, or the like is treated as the captured object for providing the background.

In S104, the AR object process 83 is executed, and the data of the AR object arranged in the real space is obtained from the memory such as the data FROM 59 in the HMD 1 or by being downloaded from the server connected through the external network 2. Alternatively, the AR object that is generated mainly by the CPU 55 of the controller 15 or generated by another application may be imported.

Step S105 is the displayed video generation process 84, and displayed video of the AR object is generated. In addition, video on the operation screen is generated.

Step S106 is the operation recognition process 85, and the movement of the instruction object or the like on the operation screen is traced from the video captured by the camera to acquire operation information, and which AR object to select or which change to apply to the selected AR object is determined.

Note that, in a loop represented by a broken line in S104 to S106, the operation recognition process 85 is executed, and when the parameters or the like of the AR object is changed or when the palm of the user is detected, the operation information of the parameters or states is provided to the AR object process 83 and the displayed video generation process 84, and reflected on the displayed video in the displayed video generation process 84.

FIG. 6 is the flow of the captured object process 82 in the MR processing. In FIG. 6, the process starts at S150. In S151, the video captured by the camera is read in. In S152, feature analysis of the video is performed, and for example, an edge is extracted, and a vertex or an inflection point of the edge is extracted as the feature point. In S153, the position data such as the distance obtained in the distance-measuring camera 11 or the sensor group 53 is provided to the feature point.

In S154, a difference between the current feature point and the previous feature point is evaluated, and in S155, the type of the like of the object is searched and specified from a set of feature points having a significant difference from an evaluation result. In S156, the result is registered as the captured object. The flow ends at S157.

FIG. 7 is the flow of the AR object process 83 in the MR processing. In FIG. 7, the process starts at S180. In S181, one captured object is selected, and in S182, the AR object is selected. As a selection candidate of the AR object, for example, the data that is stored in the CPU 55 or the external server through the communication unit 54 may be referred to. In S183, in order to associate the AR object with the captured object, subjectional parameters such as a relative position with respect to the captured object are selected, and the position, the size, and the direction of the AR object on the displayed video are provided. For example, positioning can be performed by providing offset with respect to the position of a certain feature point of the selected captured object.

Note that, in step S183, the operation information is provided from the operation recognition process 85, and a change in the parameters or the like is instructed.

In S184, it is determined whether or not the captured object associated with the AR object remains, in a case where the captured object remains (Yes), the process returns to S181, and in the case of No, the process ends at S185.

Note that, in a case where an AR object having no relationship with the captured object, for example, an AR object of a clock is placed in the screen, it is not necessary to select the captured object in S181, and it is not also necessary to associate the AR object with the captured object in S183.

In addition, the AR object process 83 is not limited to the flow described above. For example, the AR object may be generated mainly by the CPU 55 in the HMD 1 processing such as drawing, or AR object that is generated by executing another application may be imported.

FIG. 8 is the flow of the displayed video generation process 84 in the MR processing. In FIG. 8, the process starts at S200. In S201, the AR object to be displayed is selected. The AR object to be displayed is all of the AR objects associated with the real object in a display range of the HMD 1 (in the HMD 1, treated as the captured object), and each of the AR objects is processed. In S202, in a case where the display of the AR object is not set (No), S203 to S205 are skipped.

In a case where the display is set (Yes), in S203, rotation processing considering the direction of the HMD 1 and scaling processing considering the distance from the AR object are performed. In S204, a distance relationship between the AR object and the real object overlapping with the AR object on the display is evaluated, and in S205, the AR object is displayed, but in a case where the real object is in front of the AR object and there is a hidden part, the processing is performed such that the part of the AR object is not displayed. Accordingly, stereoscopic display considering a depth relationship between the real object and the AR object is performed.

In S206, in a case where there is an AR object that is not processed (Yes), the process returns to S201. In a case where the processing with respect to all of the AR objects are ends, the displayed video is completed, but in a case where palm detection information is included in the operation information from the operation recognition process 85, in S207, the palm is detected, and in S208, the operation screen is generated to be added to the displayed video. The flow ends at S209.

Figure 9:
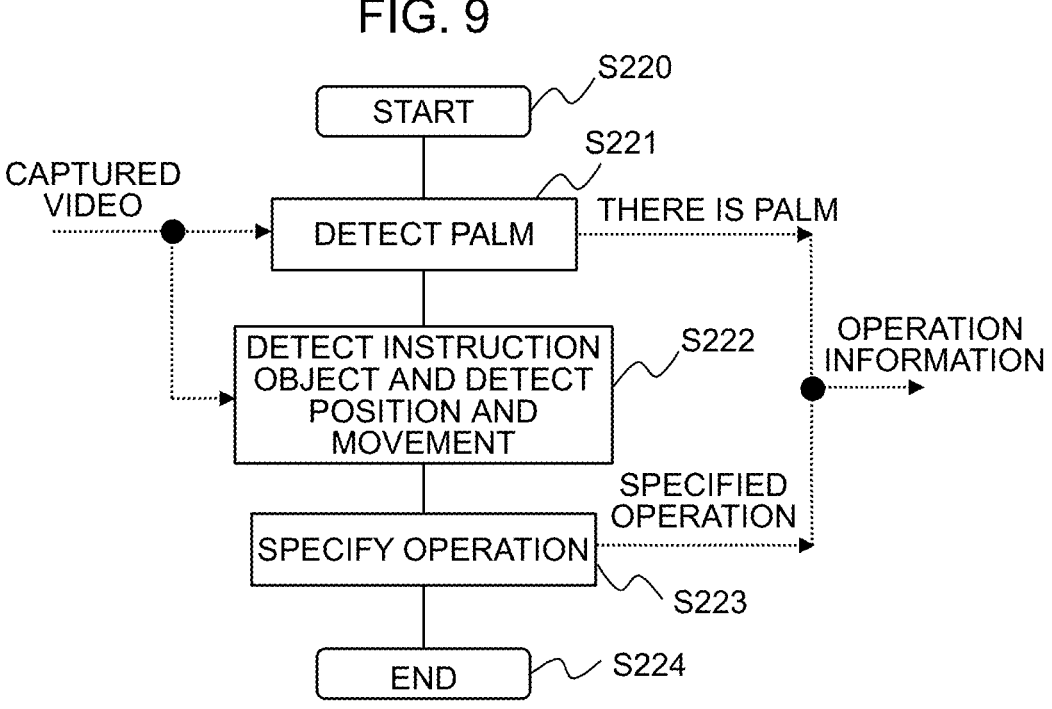
FIG. 9 is a flowchart of an operation recognition process in Example 1.

FIG. 9 is the flow of the operation recognition process 85 in the MR processing. In FIG. 9, the process starts at S220. In S221, in the video captured by the camera, whether or not there is the palm in a region close to the HMD 1 is recognized, and in a case where there is the palm, the recognition result is output as the operation information. In S222, in the video captured by the camera, whether or not there is the instruction object such as the finger on the operation screen is detected, and in a case where there is the finger, the position and the movement of the instruction object are detected. The result thereof is determined in S223, and to which AR object the operation is instructed is specified to be output as the operation information. The flow ends at S224.

As described above, according to this Example, the user is capable of displaying the operation screen on or in front of the palm of the user and directly operating the AR object reflected on the operation screen, and thus, it is possible to perform an intuitive operation in the MR space without making a large movement.

Note that, in this Example, it has been described that the operation screen is displayed on the palm of the user, but the present invention is not limited thereto, and for example, an object that can be physically in contact with the instruction object (the finger or the like) for instructing the operation screen, such as a part of the body such as the back of the hand or the arm, or an object such as a book set in advance, which is held by the hand, that is, an operation-screen display object.

Example 2

In this Example, an example will be described in which the AR object can be operated on the operation screen by one hand.

Figure 10:
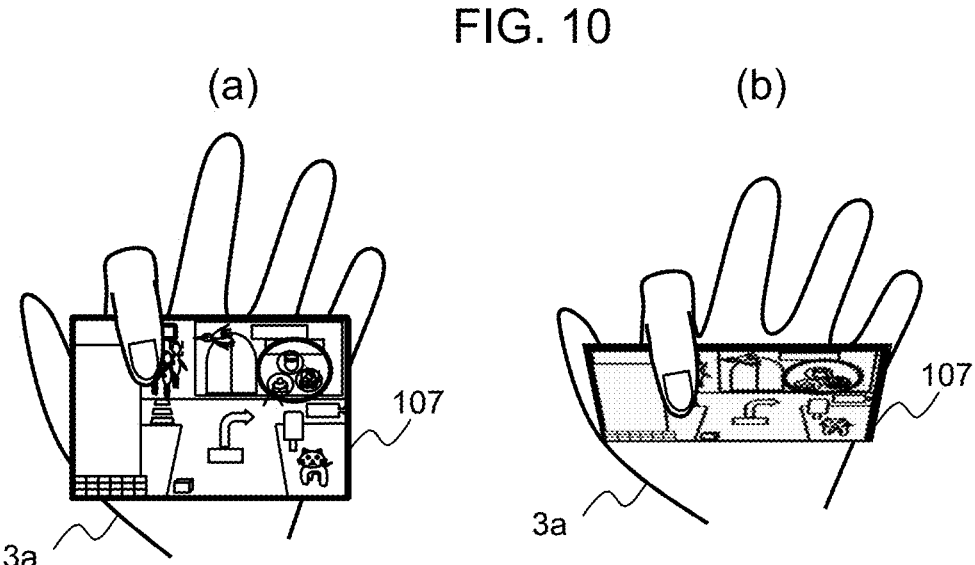
FIG. 10 is an explanatory diagram in which an AR object on an operation screen in Example 2 is selected by a one-hand operation.

FIG. 10 is an explanatory diagram in which the AR object on the operation screen in this Example is selected by a one-hand operation. In FIG. 10, the same reference numerals are applied to the same constituents as those in FIG. 4(*b*), and the description thereof will be omitted. As illustrated in FIG. 10(*a*), any of the fingers is bent from a state of opening the hand, and the AR object closest to the bent fingertip is selected.

FIG. 10(*b*) illustrates a case where the finger does not reach the AR object on the lower side in the operation screen by only bending the finger. As illustrated, a vertical direction of the operation screen is compressed by tilting the palm such that the fingertip is capable of approaching the AR object on the lower side in the operation screen, and the AR object can be selected. The tilt of the palm, for example, is detected by a distance sensor, or a change in an aspect ratio is detected form the image of the palm, and thus, the display of the operation screen is compressed in the vertical direction. As with the vertical direction, a horizontal direction can be compressed by tilting the palm to right and left, and the AR object can be selected by a more bendable finger.

Figure 11:
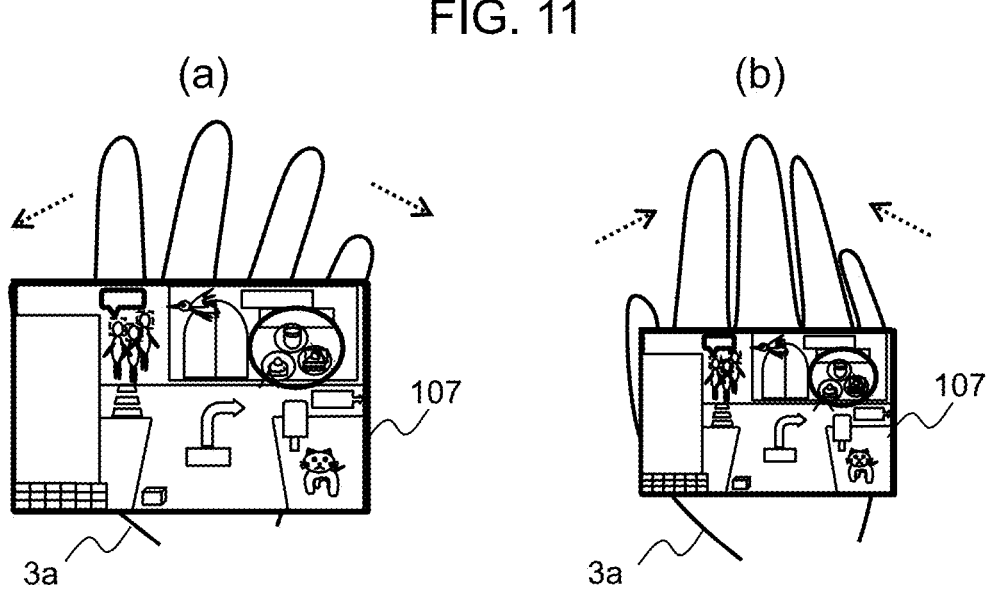
FIG. 11 is an explanatory diagram in which scaling of the operation screen in Example 2 is performed by the one-hand operation.

FIG. 11 is an explanatory diagram in which the scaling of the operation screen in this Example is performed by the one-hand operation. In FIG. 11, the same reference numerals are applied to the same constituents as those in FIG. 10, and the description thereof will be omitted. In FIG. 11(*a*), the operation screen is enlarged by widening the fingers in a direction of an arrow that is illustrated. The scaling of the operation screen is not performed by an operation of returning from a state where the fingers are widened, but the operation screen is further enlarged when the fingers are widened again. Accordingly, the operation screen can be enlarged to the approximately unconstrained size. A movement between the fingers, for example, can be detected by detecting the fingertip from the image of the palm and changing each distance between the detected fingers.

FIG. 11(*b*) is an operation of reducing the operation screen. The operation screen is reduced in a direction of an arrow that is illustrated by narrowing the fingers. As with the case of enlarging the operation screen, the operation screen reduced to the approximately unconstrained size can be obtained by a consecutive operation.

As described above, according to this Example, the AR object or the like can be operated by one hand and a small movement.

Example 3

In this Example, an example will be described in which the video on the operation screen is simplified to be more visible.

FIG. 12 is the displayed video in the MR space in this Example. In FIG. 12, the same reference numerals are applied to the same constituents as those in FIG. 4(b), and the description thereof will be omitted. FIG. 12(a) is the same MR space as that illustrated in FIG. 4(b) except for the video on the operation screen 107. FIG. 12(b) is a diagram in which the operation screen 107 in FIG. 12(a) is enlarged, for the sake of description. As illustrated in FIG. 12(b), the video on the operation screen 107 displays simplified video on the operation screen 107 in FIG. 4(b).

Figure 13:
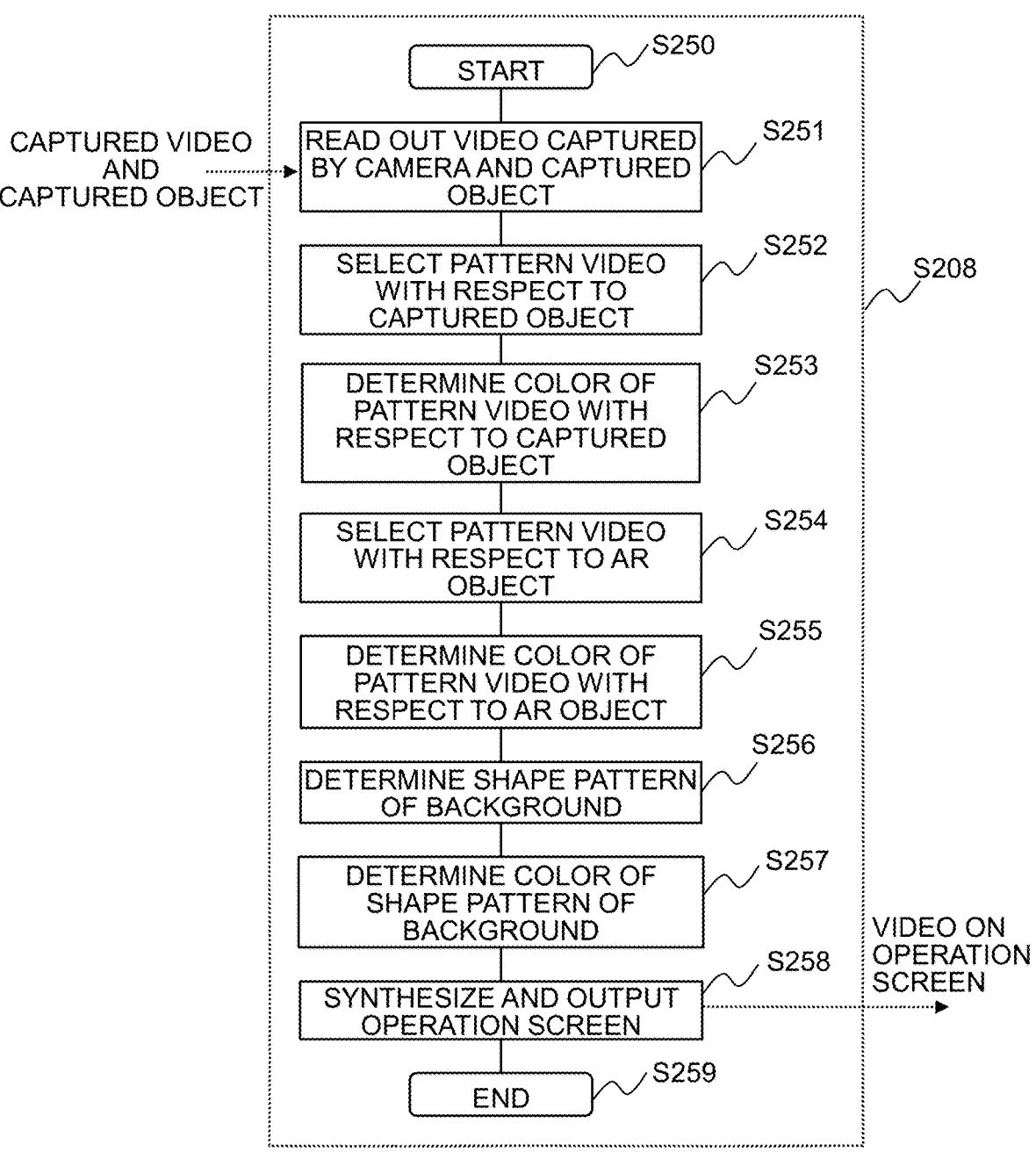
FIG. 13 is a flowchart of operation screen generation and display in Example 3.

FIG. 13 is the flow of processing corresponding to step S208 for the operation screen generation and the display of the displayed video generation process 84 in FIG. 8, in this Example. In FIG. 13, the process starts at S250, and in S251, the data of the video captured by the camera and the captured object is received.

In S252, pattern video is assigned to the captured object, and in S253, a color for drawing the pattern video is determined. The number of colors may not be limited to 1, and the colors in the upper portion and the lower portion of the pattern video may be different from each other, or the colors in the pattern video and on the frame may be different from each other. Similarly, in S254, pattern video is assigned to the AR object, and in S255, a color for drawing the pattern video is determined. Further, in S256, the shape of the background is formed into pattern video, and in S257, a color for drawing the pattern video is determined. In S258, the captured object, the AR object, and the pattern video of the background are synthesized to obtain an operation screen illustrated in 107 of FIG. 12, and the operation screen is output. The process ends at S259.

As described above, according to this Example, the operation screen is simplified, and the AR object is easily selected in the operation screen.

Example 4

In this Example, an example will be described in which only the AR object is reflected on the vide on the operation screen.

FIG. 14 is an explanatory diagram in which only the AR object is reflected on the video on the operation screen in this Example. In FIG. 14, the same reference numerals are applied to the same constituents as those in FIG. 4(b), and the description thereof will be omitted.

FIG. 14(a) is a diagram for selecting the AR object, and the user selects the AR object by pointing the AR object. After the AR object is selected, the user moves (drags) the finger pointing the AR object in a direction of an arrow of a broken line in the drawing.

FIG. 14(b) displays the AR object selected in FIG. 14(a) as the operation screen 107. In order for display, in the case of opening the palm 3a after sufficiently moving the finger downward, the operation screen 107 is displayed in front of the palm 3a. The video on the operation screen 107 is the selected AR object. Then, the user is capable of operating the AR object on the operation screen 107.

Note that, the AR object may be selected by a method other than pointing. For example, the HMD 1 may include means for detecting the visual line of the user 3, and an AR object caught by the visual line may be selected.

As described above, according to this Example, only the AR object that is an operation target is reflected on the operation screen, and the details of the AR object that is the operation target can be visually recognized on hand. In addition, since the AR object that is the operation target can be operated by being moved to a place in which the operation is facilitated, and an effect of improving operability is obtained.

Example 5

In this Example, an example of an operation method of the operation screen in an easy system in which the user raises the hand and holds the palm at the front, and then, lowers the hand or the head will be described.

FIG. 15 is an explanatory diagram of the operation method of the operation screen in this Example in the easy system. In FIG. 15, the same reference numerals are applied to the same constituents as those in FIG. 4, and the description thereof will be omitted.

In the left drawing (a1) of FIG. 15(a), the visual line of the user 3 is directed toward the front in a state where the hand is raised, as with Example 1. In the HMD 1, the hand of the user is caught in the capturing range of the camera, and the operation screen is displayed on the palm. The user 3, for example, is in a state of forming a first from the state of opening the hand, and thus, sets the AR object that can be controlled on the operation screen. The user 3 opens the hand again, and operates the AR object on the operation screen that is previously set, at an easy posture in which the hand and the face are directed downward, as illustrated in the right drawing (a2), from the posture in the left drawing (a1).

FIG. 15(b) illustrates a change in the video in the MR space, corresponding to FIG. 15(a). At the posture in (a1), the video in the MR space is video 100 on which the front real space and the AR object are reflected. In the HMD 1, the video is cyclically saved in the internal memory for approximately several seconds such that the past video is overwritten.

In a case where the posture of the user is moved as illustrated in FIG. 15 (a2), the video in the MR space is changed to video 100a on which the lower portion of the video 100 is reflected. The operation screen 107 that is previously set is displayed on the palm 3a of the user 3. The video reflected on the operation screen 107 is the video at the time of the posture in (a1), and the user 3 operates the AR object by selecting the AR object at the time of the posture in (a1). In order to cancel the set operation screen 107 to be the video 100a in the MR space that is currently seen, as with when the setting is performed, a gesture such as forming the opened palm into the shape of a first or sliding the finger 3a to the outside from a place in which there is no AR object is registered as a cancel command, and the corresponding gesture is executed, and thus, the operation can be easily performed.

As described above, in this Example, the user is capable of operating the MR space at an easy posture.

Note that, in this Example, the background of a real image in the operation screen 107 is fixed, but it is not necessary to stop the operation of the moving AR object. By setting a processing range of the AR object to the video 100 and the video 100a in the MR space, the AR object in the operation screen 107 can be kept moving as with the image that is displayed on the video 100 in the MR space.

In addition, the setting and the cancelling of the operation screen may not be limited to the gesture described above, and for example, the operation screen may be set by other gestures, the recognition of the sound or the palm for several seconds, or the like.

Example 6

In this Example, an example of an operation method will be described in which the user may not raise the hand and hold the palm at the front.

Figure 16:
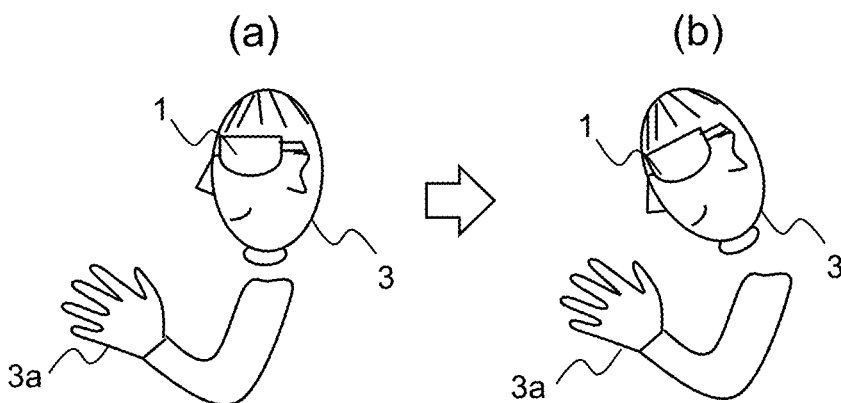
FIG. 16 is an explanatory diagram of an operation method in which a user in Example 6 may not raise a hand and hold a palm at the front.

FIG. 16 is an explanatory diagram of the operation method in which the user in this Example may not raise the hand and hold the palm at the front. In FIG. 16, the same reference numerals are applied to the same constituents as those in FIG. 15, and the description thereof will be omitted.

In FIG. 16(*a*), the visual line of the user 3 is directed toward the front in a state where the hand is lowered. At such a posture, in the HMD 1, the hand of the user is not caught in the capturing range of the camera. In order for the user 3 to perform the operation in the MR space from such a posture, as illustrated in FIG. 16(*b*), the face is directed downward, and in the HMD 1, the palm 3*a* is in the capturing range of the camera. At this time, it is not necessary for the user to move the hand.

A change in the video in the MR space is identical to that in FIG. 15(*b*). At the time of the posture in FIG. 16(*a*), the video in the MR space is the video 100 on which the front real space and the AR object are reflected. At this time, in the HMD 1, the video is cyclically saved in the internal memory for approximately several seconds such that the past video is overwritten.

In a case where the posture of the user in FIG. 16(*b*) is moved, the video in the MR space is changed to the video 100*a*, and the lower portion of the video 100 is reflected and the palm 3*a* of the user is caught. Such a movement is detected by the sensor group 53 of the HMD 1, and in the HMD 1, the saving of the video in the internal memory is stopped, and the video saved in immediately preceding FIG. 16(*a*) is read out to be the video on the operation screen. The video reflected on the operation screen 107 is the video at the time of the posture in FIG. 16(*a*), and the user 3 operates the AR object by selecting the AR object at the time of the posture in FIG. 16(*a*).

As described above, in this Example, the user is capable of operating the MR space by only a movement in which the head is slightly directed downward.

Example 7

In this Example, an example will be described in which even in a case where a viewing angle of a video display unit is comparatively narrow, the same effect as that in Example 5 or Example 6 is obtained and the real space image that is the background on the operation screen is set to be a real-time moving image, by using a wide-angle camera.

Figure 17:
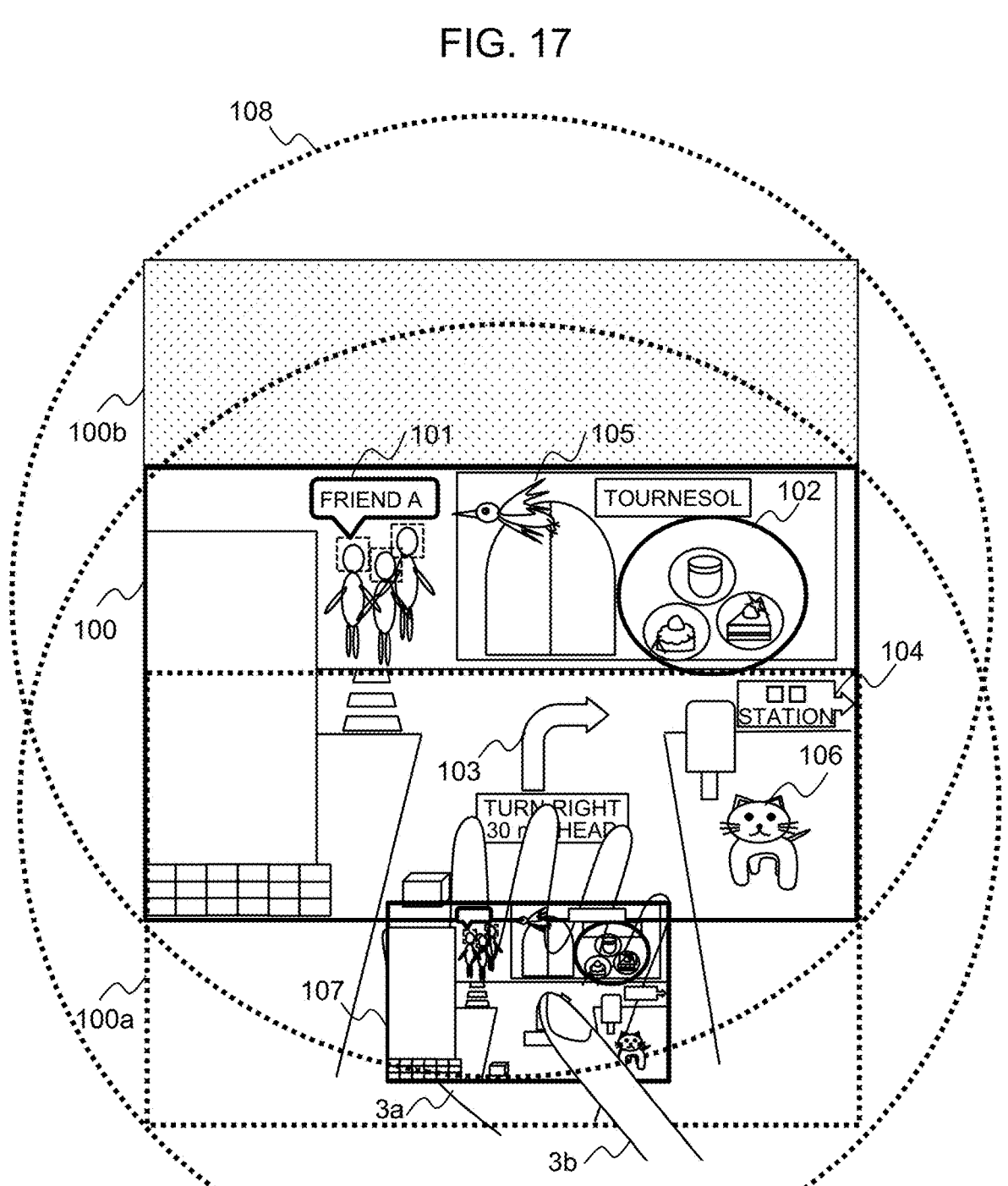
FIG. 17 is an explanatory diagram illustrating a relationship between a capturing range of a wide-angle camera, displayed video in an MR space, and an operation screen in Example 7.

FIG. 17 is an explanatory diagram illustrating a relationship between a capturing range of the wide-angle camera in this Example, the displayed video in the MR space, and the operation screen. In FIG. 17, the same reference numerals are applied to the same constituents as those in FIG. 4(*b*), and the description thereof will be omitted.

In FIG. 17, a reference numeral 108 is a range in which the wide-angle camera 10 optically captures an image at the posture in (a1) of FIG. 15, and the wide-angle camera 10 performs wide-angle capturing by an imaging element corresponding to a range in which in which the video 100 and video 100*b* are combined from the range 108.

The MR space is the video 100 (a solid line) at the posture in FIG. 15(*a*1). The video 100 is the background in the real space seen through the transmission-type optical system 13, and the video onto which the AR object is projected by the display optical system 12 is the MR space. The wide-angle camera 10 includes a wide-angle capturing range in the video 100*b* upper than the real space seen through the transmission-type optical system 13.

In a case where the posture of the user is changed to the posture in FIG. 15(*a*2) from such a state, an optical range of the wide-angle camera is moved to a range 108*a*. At this time, the video in the MR space is the video 100*a*, and the palm 3*a* of the user is caught. The operation screen is reflected on the front of the palm 3*a*, but the video is set to be the video 100 in the region upper than the wide-angle capturing range, and thus, the MR space operated by the user, which is an operation range of the MR space, is not changed before and after the posture is changed. At this time, in the HMD 1, the generation and superimposition processing of the AR object are performed in the range of the MR space 100 and the MR space 100*a*.

Further, since the video in the operation range is continuously captured by the wide-angle camera, it is possible to obtain a real-time real space image and follow the AR object to be captured in real time.

As described above, in this Example, the user is capable of performing the operation at the easy posture or operating the MR space by only the movement in which the head is slightly directed downward, and displaying and operating the AR object according to the video in the changing real space.

Example 8

In Example 1, the AR object is displayed by being projected onto the transmission-type optical system, and the front landscape or the real object is seen by the user through the transmission-type optical system, by using the transmission-type optical system. In contrast, in this Example, an example of using an HMD of a video through method will be described.

In the video through method, a video image in which the image of the front landscape or the real object is captured by the camera and the AR object are synthesized and displayed on the display device. Note that, a configuration block diagram of the HMD in this Example is omitted. In addition, the camera is configured as a pair of cameras, and may be a 3D camera that not only obtains right-left parallactic video captured by the camera but also obtains position information such as the distance from the real object or the background in the video captured by the camera from parallactic information.

In the case of using the transmission-type optical system, there is a possibility that a a shift may occur due to a parallactic effect or the like when the AR object is pasted to the real space, but according to the video through method as with this Example, when the video image and the AR object are synthesized, the parallactic effect or the like can be adjusted, and synthetic video without a shift can be generated.

As described above, Examples of the present invention have been described, but the present invention is not limited to Examples described above, and includes various modification examples. For example, Examples described above have been described in detail in order to facilitate the understanding of the present invention, and are not necessarily limited to include all configurations described above. In addition, it is possible to replace a part of the configuration of one Example with the configuration of another Example, and it is also possible to add the configuration of another Example to the configuration of one Example. In addition, it is possible to add, delete, and replace a part of the configuration of each Example with another configuration. In addition, a part or all of the respective configurations, functions, and processing units described above, for example, may be attained by hardware such as being designed with an integrated circuit. In addition, hardware and software may be used together.

REFERENCE SIGNS LIST

1 Head-mounted display (HMD)
3 User
3*a* Palm of user
3*b* Finger of user
10 Camera
11 Distance-measuring camera
12, 12*a*, 12*b* Display optical system (video projection unit)
13 Transmission-type optical system
15 Controller
51 Feature extraction processing unit
52 Distance calculation processing unit
53 Sensor group
54 Communication unit
55 CPU
56 RAM
57 Video RAM
58 Program FROM
59 Data FROM
81 Overall control process
82 Captured object process
83 AR object process
84 Displayed video generation process
85 Operation recognition process
100, 100*a* MR space
101, 102, 103, 104, 105, 106 AR object
107 Operation screen

The invention claimed is:

1. A head-mounted display displaying an augmented reality (AR) object in a real space so as to form a mixed reality (MR) space, the display comprising:
   a camera configured to capture a video of the real space;
   a display; and
   a processing circuit configured to:
      recognize a real object in the real space using the captured video from the camera;
      generate a video of the MR space including the real object and the AR object;
      display the generated video of the MR space on the display; detect, from the captured video, a predetermined object;
      generate, in response to detecting the predetermined object, an operation screen that is a simplified version of the MR space by converting the real object and the AR object into patterned video; and
      display the operation screen on the detected predetermined object.

2. The head-mounted display according to claim 1, wherein the processing circuit is configured to recognize a movement of an instruction object on the operation screen, and the AR object in the MR space is operated in accordance with the movement of the instruction object.

3. The head-mounted display according to claim 2, wherein the instruction object is a finger of a user of the head-mounted display, and the AR object is operated in accordance with a movement of the finger.

4. The head-mounted display according to claim 1, wherein the processing circuit is configured to recognize a movement of a finger of a user of the head-mounted display on the operation screen, and the AR object and the operation screen are operated in accordance with the movement of the instruction object.

5. The head-mounted display according to claim 4, wherein the predetermined object is a palm or a back of a hand of the user.

6. The head-mounted display according to claim 1, wherein a capturing range of the camera is wider than a display range of the MR space.

* * * * *